Patented Apr. 10, 1934

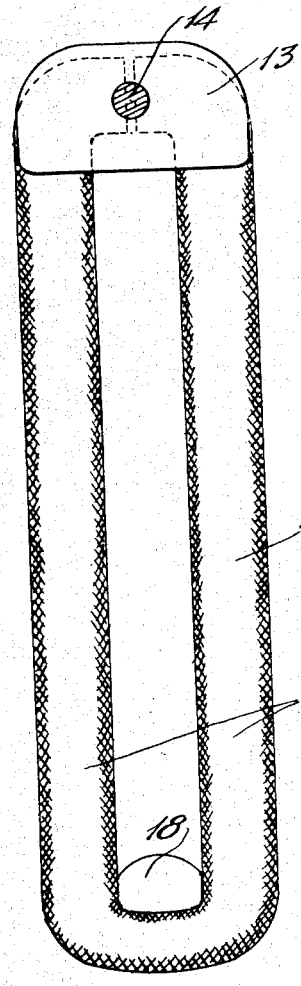
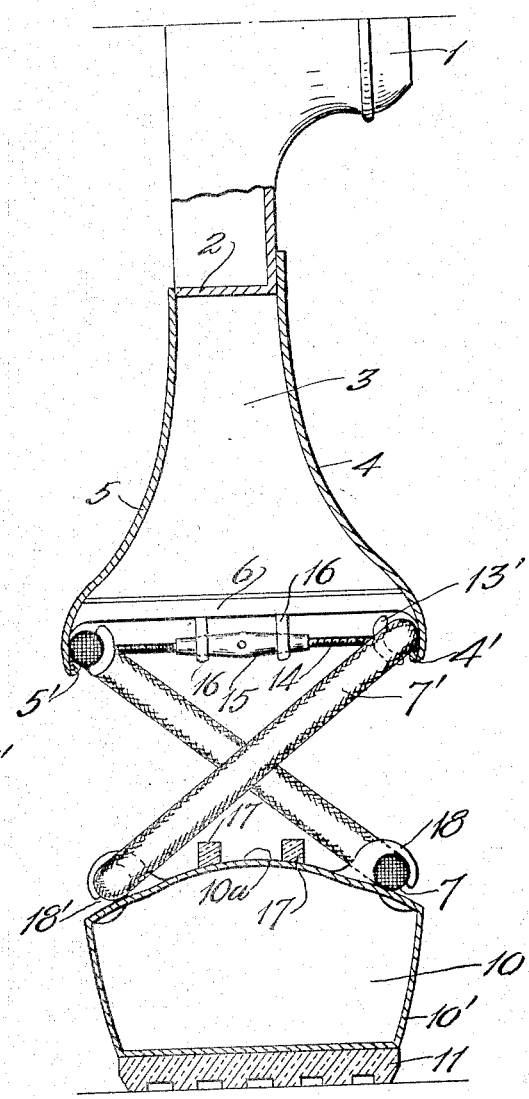
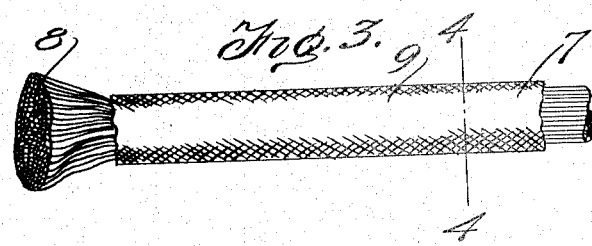
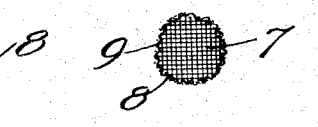

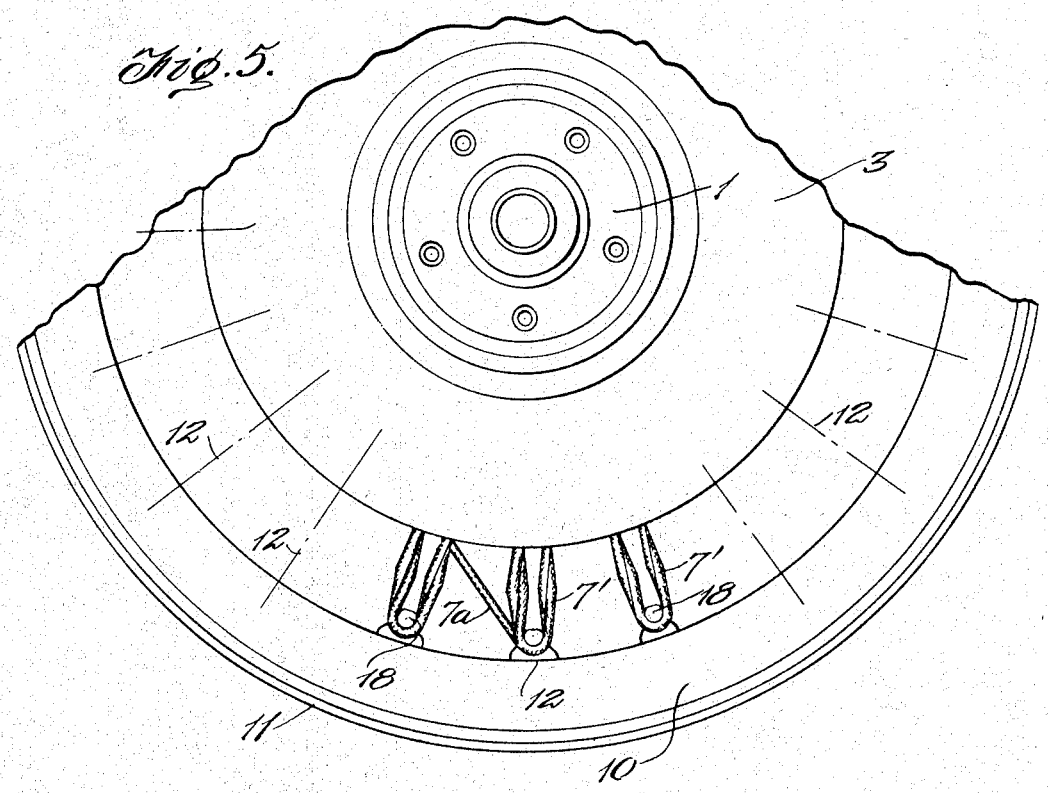
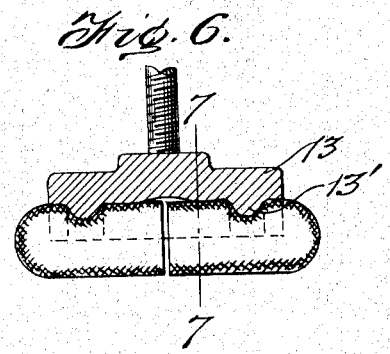
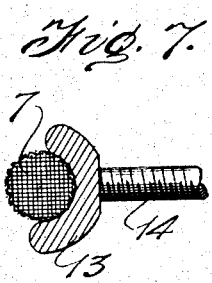

1,954,214

UNITED STATES PATENT OFFICE 1,954,214

ELASTIC TIRE

James V. Martin, Garden City, N. Y.

Application May 17, 1930, Serial No. 453,273

10 Claims. (Cl. 152—28)

This invention relates to cushioning means adjacent the periphery of vehicle wheels and has for its objects lightening the weight, lowering the cost, increasing the durability and dependability of tires while affording a greater degree of cushioning than that now obtained by conventional phenumatic tires.

A further important object of my invention is to provide a form of tire which will remain cool while running under great load and at high speed.

A still further object of my invention is to simplify tire and wheel construction, eliminating the conventional rim and providing a ready method of replacing the tire cushioning elements.

With these and other objects in view, which will become manifest as one peruses the following description with reference to the appended drawings, the preferred manner of applying my invention is disclosed as follows:—

Fig. 1 shows my new form of tire, partly in section as applied to an automobile road wheel having a conventional hub and as viewed in elevation transversely to the plane of rotation of the said wheel.

Fig. 2 shows my novel arrangement and application of rubber as a cushioning means for the new tire, while Fig. 3 discloses the nature of the said cushioning means and Fig. 4 shows a cross section of the same taken upon the line 4—4 of Fig. 3.

Fig. 5 shows the method of applying my invention to a vehicle wheel as seen in side elevation, the upper portion of the said wheel being broken away.

Fig. 6 shows a form of gripping means for holding the special cushioning means, while Fig. 7 is a cross section of same taken on the line 7—7 of Fig. 6.

Referring in more detail to the application of my invention, 1 is a conventional type hub representative of either front or rear steering or drive wheels and having a conventional brake drum 2. A wheel portion 3 may be either welded to the said hub portion of demountably attached thereto by bolts in a well known manner.

The said wheel portion 3 may be made up of very light gauge sheet steel plates such as front or face plate 4 and inner plate 5 and these should be well braced apart by angle irons 6 at the positions for the attachment of my special cushioning means 7.

It will be observed that the discs 4 and 5 are beaded at their peripheries 4' and 5' where they form a back rest and protection for the rubber cushioning cords 7. These cords are made up of multiple rubber threads 8 which are held in a constant state of tension by a web fabric covering 9. The cooperative action of the web fabric covering and the rubber has a peculiar relation to the function and operation of my new form of tire, among other things, it enables me to select just the correct tension for my cord cushioning means without having this tension felt by my new application when in normal position. It will be observed that I maintain the lateral relation of my tire ring 10 and its tread 11 by means of these cords 7. To do this it is necessary to build up the ring element 10 semi-rigidly by means of steel sheet metal 10' and 10a formed for lightness and strength and to cross the cords 7 in the manner shown by Fig. 1. If it were not for the fact that the web form of fabric cover 9 held the rubber threads in an initial state of tension adapted by practice and experiment to just the required lateral resistance for a desired radial cushioning, this proportioning would have to be obtained by putting tension upon the rubber on assembly of the loops 7 into the wheel and tire, but this would defeat its own purpose because, while one of the cross loops 7 would resist lateral displacement of the wheel and tire elements 3 and 10 the other loop would aid the said displacement and nullify the effect initially of the aforesaid resistance. As I apply the invention the cords are nicely proportioned by building into the rubber threads just the correct tension so that when the web fabric cover is tightly collapsed and thus holding a certain tension in the rubber each respective loop 7' resists strongly any further force to further tension it, but, as a loop it has little tendency to contract.

Thus we secure an indispensable stiff lateral resistance to any lateral tire displacement while at the same time obtaining a soft cushioning action radially proportioned to yieldably support the wheel and hub portions 3 and 1. Of course it will be noticed that the web fabric besides contributing this valuable attribute to my invention, protects the rubber thread automatically from air, light and dirt, because the tension under which the rubber cords are bound by the fabric cover holds the cotton threads of the web closely against each other to exclude light, air and dirt. It is also well known by rubber experts that rubber held in constant tension is more durable than rubber at rest.

After experimenting with several actual applications of my invention I am of the opinion that the simple loops 7' crossing as shown in Fig. 1 at intervals indicated by center lines 12 of Fig.

5 will be sufficient for all torque drive and braking stresses as well as the lateral and radial stresses of the wheel and that it will not be necessary to supply auxiliary cords 7a, but if desired they may be applied in the direction indicated by 7a. Automobile designers have sought for a gradual means of applying both drive and braking to vehicle road wheels so as to avoid the great stresses and strains due to abrupt application of power and my invention automatically supplies this long felt need through the elements 7, 7' and 7a above described.

Of course it is relatively unimportant whether the loops 7' are made up as such endless or made up as illustrated of short lengths of rubber cord 7 having ends held by clamps 13 having beads 13' and subject to pressure from the threaded part 14 of turnbuckle or transverse brace 15, carried loosely by circular rings 16 which can extend continuously around the inner wheel part connecting up all the angleirons 6 and affording a contacting part for the rubber bumpers 17 on the top 10a of tire part 10. Any suitable means of holding the opposite loop end may be used and I show a flanged hook having carefully radiused contacting portions for the fabric 9 and having a restricted opening 18' so that once the loop is pressed into place it will not again shake out of the said hook although it may become loose by reason of radial displacement under load of the wheel parts 1 and 3.

It is most important in applying this invention to keep down the weight of the entire wheel and tire particularly for aeroplane use also the so-called unsprung part of the tire, i. e. part 10. At the same time it will be realized that to be practical, the ring 10 must never deform so much as to crystalize the metal of which it is built. To accomplish these conflicting results I employ a very light gauge sheet steel wall 10' and 10a, too light to hold the weight of the vehicle load suspended from its upper portion without deforming into an elipse, and then I employ the initial tension already described as characterizing the loops and cords 7' and 7 to prevent the side bulging into the said eliptical form.

It will be noticed that the crossing of the rubbers from the inside part of the wheel rim to the outside margins of the hoop portion 10 and from the outside of the wheel rim to the inside of the hoop 10 margins makes it necessary that all or nearly all of the rubber cords around the circle be stretched before lateral displacement of wheel and tire can take place and to accomplish this relationship while at the same time holding the semi-flexible hoop 10 within its elastic limits is the chief aim of my invention: this can be accomplished with least rubber by using the wrapped elastic cords as shown in Fig. 3, but any form of rubber or other elastic material crossed as shown will accomplish the end sought.

While the prior art shows a vague searching for the functions of the rings and loops, as for example in James, No. 1,327,478, the elastic cushioning characteristic of the rubber threads with their great range of movement and held in a desired state of constant initial tension were absent as well as other features such as means of keeping the working rubber 11 at all times exposed to air and metal to radiate the heat and although the rubber cords 7 are per se old as applied to the aeroplane and automobile art the novel combinations of these old elements as herein disclosed will make available to the world the first practical substitute for the well known pneumatic tires presently employed with their attending dangers through becoming flat and of burning up by reason of confined air and heat at high speeds.

Obviously there are many differing ways of applying my invention without departing from the essential relationships disclosed and I do not limit myself to any of said forms.

What I claim as new is:—

1. A tire for a vehicle wheel, including a rubber tread for road contact, a hoop portion upon which the said tread is mounted and rubber cords, held under tension and leading diagonally across each other from opposite sides of the said hoop and wheel.

2. In combination with a vehicle wheel a tire for same including a hoop carrying a tread and means for holding the said hoop yieldably within the plane of the said wheel's rotation by diagonally crossed rubber cords connecting the said wheel and tire, the said cords leading from correspondingly opposite faces of the said hoop and wheel to resist lateral displacement of the said tire and forming the only connection therebetween.

3. In combination with a vehicle wheel and tire a tire portion held yieldably in spaced apart relation to said wheel by means of rubber cords stretched diagonally from the inside face of the said tire to the outside face of the said wheel and other similar cords stretched from the outside face of the said tire to the inside face of the said wheel and the said cords comprising the only means preventing lateral displacement of said wheel and tire.

4. A tire for a vehicle wheel held in spaced apart relation to the said wheel by means of elastic cords and held yieldably against lateral displacement by said cords, and attachments for the said cords located on the inner portion of the said tire relative the wheel center and adjacent the lateral margins thereof, the said cords crossing each other diagonally to corresponding margins of the said wheel.

5. In combination with a vehicle wheel a tire yieldably attached thereto by means of elastic bands tightly bound into separate cords and held under a constant minimum tension by means of web-like fabric coverings and some of the said cords leading at an acute angle to resist relative lateral displacement of the said wheel and tire.

6. A vehicle wheel and tire combination including a wheel having spaced apart radial margins, a tread carrying hoop separated from the said margins by an air space and elastic connections crossing each other in pairs in the said space from the said margins to attachments on the said hoop, the said connections being spaced apart by a brace at their attachments to the said margins.

7. The combination of a wheel having a rim and a tire having a tread portion, the said rim and portion held in rotational alignment by pairs of elastic connections crossed diagonally from attachments on the outer and inner margins of rim and portion respectively and the four said attachments for each pair of connections lying substantially in one of the axial planes of the said wheel.

8. The combination of a wheel and a tire tread portion spaced apart and held against lateral displacement by pairs of diagonally crossed elastic connections lying substantially in a plane and additional elastic connections for said wheel and portion, leading at an angle to the plane containing the first said connections.

9. In combination with a tire for a vehicle wheel, elastic cords spacing the said tire and wheel apart in a laterally and radially yieldable relation to each other, the said cords being diagonally crossed so as to resist lateral displacement of wheel and tire.

10. In combination with a vehicle wheel a tire having a hoop portion carrying the said wheel yieldably in tension by elastic cords connecting the upper portion of the said hoop portion to the said wheel and supporting the load thereof, other similar cords connecting the said wheel and hoop portion intermediate the upper and lower extremities of the said hoop and resisting the circular deformation of same and still other similar cords connecting the said tire hoop and wheel adjacent the ground and all of the said cords resisting lateral displacement therebetween and being diagonally crossed adjacent each other for that purpose and exposed to the external air for cooling.

JAMES V. MARTIN.